(No Model.) 2 Sheets—Sheet 1.

E. E. ELLIS.
MAGAZINE CAMERA.

No. 500,707. Patented July 4, 1893.

Witnesses:
R. F. Osgood.
C. G. Crannell

Inventor:
E. E. Ellis.
By Geo. B. Selden.
Atty.

(No Model.) 2 Sheets—Sheet 2.

E. E. ELLIS.
MAGAZINE CAMERA.

No. 500,707. Patented July 4, 1893.

Witnesses:
R. F. Osgood.
C. G. Crannell.

Inventor:
E. E. Ellis,
By
Geo. B. Selden,
atty.

UNITED STATES PATENT OFFICE.

EDGAR E. ELLIS, OF ROCHESTER, NEW YORK, ASSIGNOR OF TWO-THIRDS TO EZRA R. ANDREWS AND AUGUST L. LEHNKERING, OF SAME PLACE.

MAGAZINE-CAMERA.

SPECIFICATION forming part of Letters Patent No. 500,707, dated July 4, 1893.

Application filed April 18, 1893. Serial No. 470,820. (No model.)

*To all whom it may concern:*

Be it known that I, EDGAR E. ELLIS, a citizen of the United States, residing at Rochester, in the county of Monroe, in the State of New York, have invented certain Improvements in Magazine-Cameras, of which the following is a specification, reference being had to the accompanying drawings.

My invention relates to an improved magazine holder for photographic cameras, designed to carry either sensitized glass plates or films of any preferred kind, and to expose the same in succession by a simple, cheap and easily managed mechanism.

My invention is fully described and illustrated in the following specification and the accompanying drawings, the novel features thereof being specified in the claims annexed to the said specification.

My improved magazine holder is represented in the accompanying drawings, in which—

Figure 1:
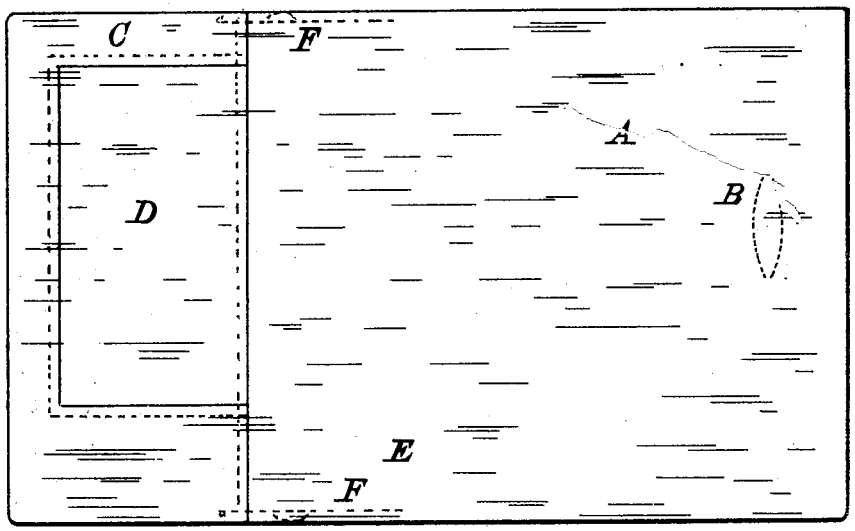
Figure 2:
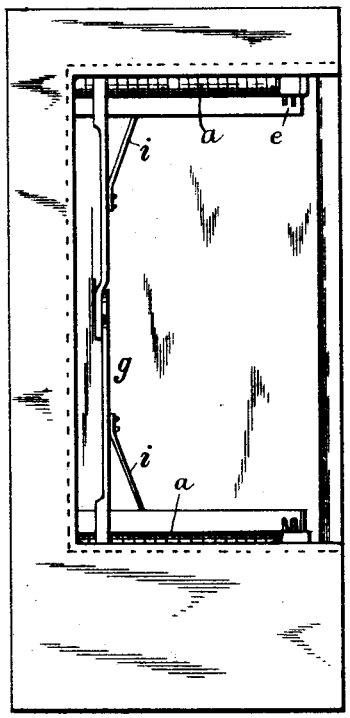
Figure 3:
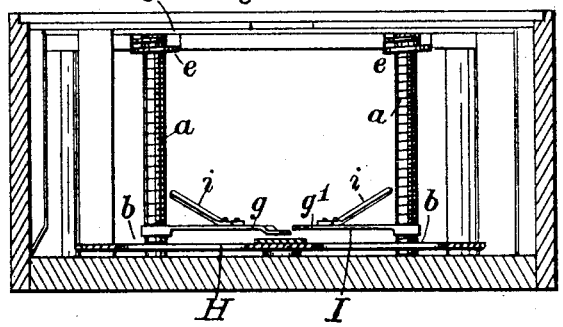
Figure 4:
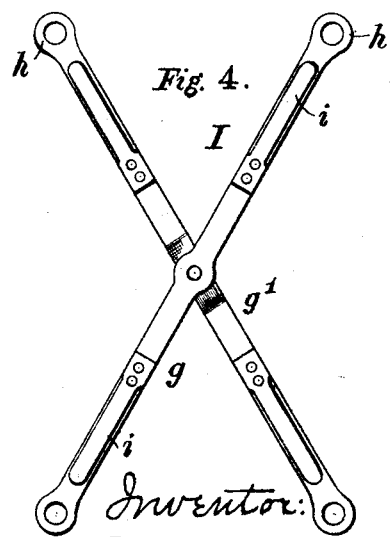
Figure 5:
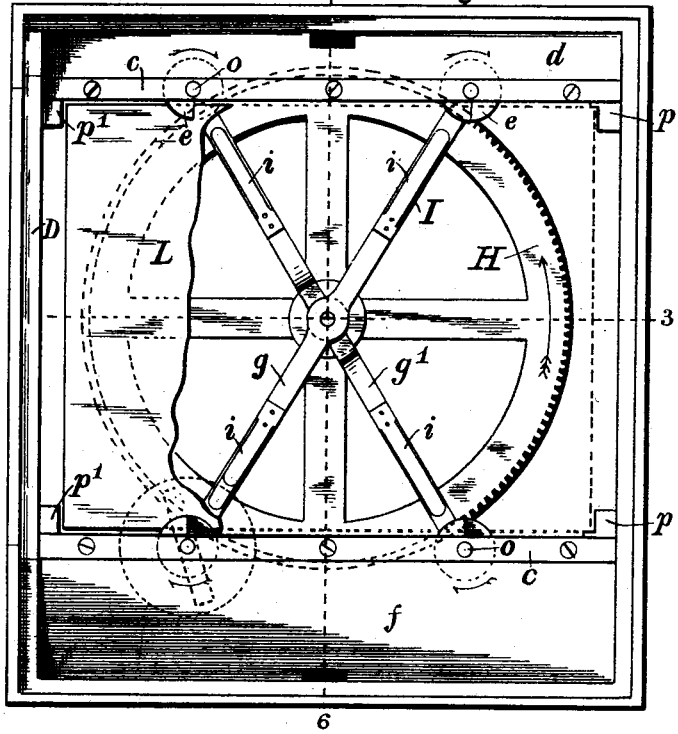
Figure 6:
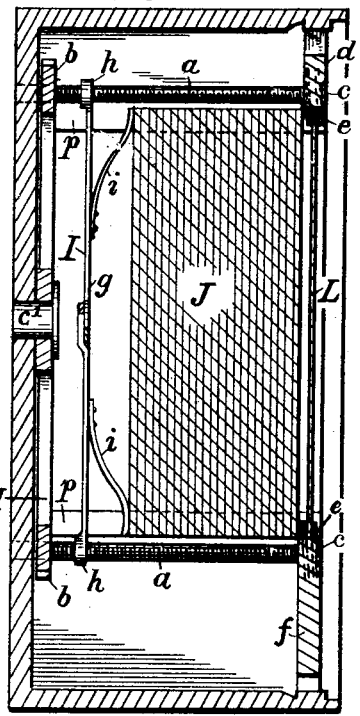
Figure 7:
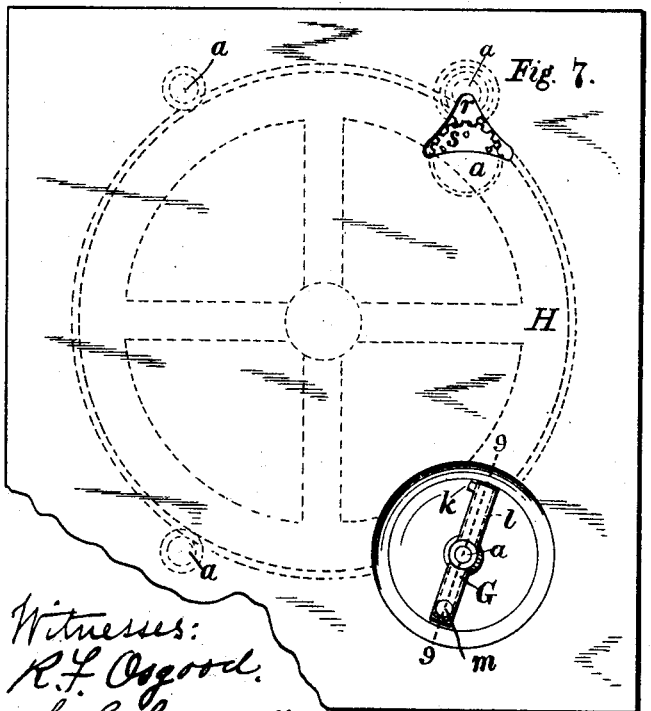
Figures 8, 10:
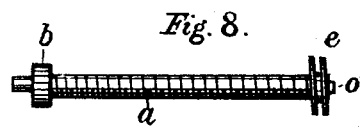
Figure 9:
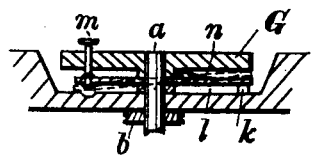

Figure 1 is a side elevation of a camera with my improved magazine holder attached thereto. Fig. 2 is a side view of the holder, the sliding door through which the unexposed plate or films are inserted, being removed. Fig. 3 is a section of the holder on the line 3—3, Fig. 5, showing the parts above that line. Fig. 4 represents the follower frame detached. Fig. 5 is a front view of the holder, showing a portion of a plate or film in position for exposure. Fig. 6 is a section of the holder on the line 6—6, Fig. 5, showing the parts to the right of said line. Fig. 7 is a rear elevation of the holder. Fig. 8 represents one of the feed-screws detached. Fig. 9 is a section through the operating crank or lever, on the line 9—9, Fig. 7. Fig. 10 represents the front end of one of the feed-screws.

My improved holder may be applied to any suitable camera.

In the drawings A, Fig. 1, represents the body of the camera, which may be of any suitable or preferred construction, provided with a lens B, and any suitable focusing mechanism and exposing shutter.

C is the holder, which is attached to the rear of the body by the usual rabbeted or light tight joint, and is provided with the door D at one side through which the unexposed plates are inserted into the magazine. The holder is detachably connected with the body, by any suitable hinges or catches, F, Fig. 1.

The plates or films in my improved holder are fed forward one after the other into the position for exposure, by turning a crank or lever G, Fig. 7, on the rear end of the holder,—a suitable septum being interposed between each negative sheet,—and a series of screws and a follower being employed to carry the sheets forward to the focusing plane. It will be understood that when films or flexible supports for the sensitive material are employed, they are provided with suitable carriers. After the sheets for the production of negatives have been exposed, one after the other, they are deposited in a receptacle in the lower part E of the camera in front of the holder.

The mechanism for advancing the plates or films, consists of a series of screws, $a\ a\ a$, arranged parallel with each other at suitable distances apart within the holder, and connected together so as to rotate simultaneously. In the construction shown, the screws are arranged to be rotated at the same time by means of the gear H, which meshes with the pinions $b$ on the rear ends of the screws. The handle or crank G is attached to the rear end of one of the screws, so that by turning it the screws, through the gear H, are all caused to rotate. The gear revolves on a suitable stud $c'$ inserted in the back of the holder. The rear ends of the screws revolve in suitable journals in the back,—their front ends being supported at $o$ in holes in the bars $c\ c$, Figs. 5 and 6, attached to the plates $d$ and $f$ at the front of the holder. It will be understood that the distance between the bars $c\ c$ corresponds with the width of the plates or carriers which the holder is designed to carry,—a slight allowance being made for clearance. At their forward ends the screws are provided with the enlarged spiral threads $e$, of a diameter sufficient to project over and engage with the edges of the plates or carriers. These threads extend around the screw about one and one-half turns, so that as they revolve, their outer ends discharge the foremost plate or carrier, while their inner ends engage with the next plate and move it forward into the focal plane.

In order to cause the plates to engage with the inner ends of the enlarged screw-threads, it is necessary to urge them forward constantly, and this is accomplished by the follower I, carried by the screws $a$, and arranged to bear on the rear plate through a suitable interposed spring or cushion.

In the construction shown the follower I consists of the crossed bars $g$ $g'$, attached together at the point where they cross, and provided at their ends with perforated bosses $h$ threaded to receive the screws $a$. A spring or springs may be interposed between the follower and the rear one of the unexposed plates, J, Fig. 6, in any suitable manner. This is conveniently effected by attaching the springs $i$ to the bars $g$ $g'$.

In Figs. 5 and 6, the foremost plate or film is indicated at L in position for exposure. At this time its edges are engaged with the threads $e$ on the forward ends of the screws, $a$, and the crank G is arrested by a stop, $k$, which arrests its motion at the position when the foremost film occupies the focal plane. The operator knows that when the crank G is arrested by the stop the foremost plate is in the focal plane, ready for exposure. A spring or detent, $l$, Fig. 9, attached to the crank, comes in contact with the stop $k$. When it is desired to turn the crank, the detent $l$ is moved out of contact with the stop by pressure on the button $m$. A spring $n$ keeps the detent normally in position to come against the stop as the crank revolves. The detent is attached to the hub of the crank in such way as to permit the requisite movement.

In Fig. 9 the movement of the detent which permits the end of it to pass over the stop $k$ when the button $m$ is pressed inward, is indicated by dotted lines. The opening in the detent through which the shaft $a$ passes, is enlarged laterally so as to permit this movement. The inner end of the pin which carries the button $m$ is riveted or otherwise attached to the detent, so that the detent is compelled to rotate with the crank G. Any other suitable means may be employed for arresting the rotation of the crank at the proper point.

Suitable ways or guides $p$ $p'$ are employed to keep the plates or carriers in the proper position, as they are urged forward by the follower, and engaged by the threads $e$ $e$. The guides $p'$ $p'$ are attached to the sliding door D, so that they are removed when the door is taken out to load the magazine with unexposed plates or films. The door is fitted into the holder light-tight, and, when the holder is detached from the body of the camera, the door is readily removed by sliding it edgewise out of the grooves in the wall of the holder. It will be understood that the threads $e$ are beveled on their ends, so that they may readily enter between the carriers and separate them from each other.

In Fig. 5, the film or carrier L is shown as partially broken away, to display the parts behind it. The lead or pitch of the screws on the larger threaded sections is greater than the lead on the smaller sections,—a proportion which I have found to work satisfactorily in practical use being two to one.

A counter consisting of two differential gears $r$ and $s$, Fig. 7, may be applied to one of the feed-screws.

My improved camera is simple and cheap in construction, and entirely reliable in practical use.

The threads $e$ may be made of any suitable length adapted to hold the films or plates.

I claim—

1. The combination, in a magazine holder, of a series of parallel screws, having short threaded sections of greater diameter at their forward ends, the lead of the screws on the larger threaded sections being greater than the lead of the screws on the smaller threaded sections, means for rotating the screws simultaneously, a follower threaded on the smaller sections of the screws, and provided with a spring or springs whereby the unexposed films or carriers are pressed forward to engage with the enlarged threaded sections, substantially as described.

2. The combination, in a magazine holder, of the screws $a$ $a$ $a$, provided with enlarged threaded sections $e$, and pinions $b$, the gear H, and the follower I, consisting of bars $g$ $g'$, and provided with the springs $i$, substantially as described.

3. The combination, in a magazine-holder, of a series of screws $a$, having enlarged threaded sections $e$, and connected to rotate simultaneously, the follower I provided with a spring or springs, and fitted to the screws $a$, and the plates $d$ and $f$, carrying bars $c$, substantially as described.

4. The combination, in a magazine-holder, of a series of screws $a$, having enlarged threaded sections $e$, and connected to rotate simultaneously, the follower I provided with a spring or springs, and having threaded bosses which engage the screws $a$, and the guides $p$ $p'$, substantially as described.

EDGAR E. ELLIS.

Witnesses:
 GEO. B. SELDEN,
 C. G. CRANNELL.